United States Patent
Schmitt

(10) Patent No.: US 7,550,084 B2
(45) Date of Patent: Jun. 23, 2009

(54) REVERSE OSMOSIS WATER FILTERING SYSTEM

(75) Inventor: Craig A. Schmitt, Phoenix, AZ (US)

(73) Assignee: Watts Water Technologies, Inc., North Andover, MA (US)

(*) Notice: Subject to any disclaimer, the term of this patent is extended or adjusted under 35 U.S.C. 154(b) by 130 days.

(21) Appl. No.: 11/799,340

(22) Filed: May 1, 2007

(65) Prior Publication Data

US 2007/0256977 A1    Nov. 8, 2007

Related U.S. Application Data

(60) Provisional application No. 60/746,242, filed on May 2, 2006.

(51) Int. Cl.
*B01D 63/00* (2006.01)
*B01D 61/00* (2006.01)
*B01D 21/30* (2006.01)
*C02F 9/00* (2006.01)

(52) U.S. Cl. .............. 210/257.2; 210/416.1; 210/652; 210/195.2; 210/134

(58) Field of Classification Search .............. 210/257.2, 210/651, 321.72, 177, 134, 652, 195.2
See application file for complete search history.

(56) References Cited

U.S. PATENT DOCUMENTS

| | | | |
|---|---|---|---|
| 4,705,625 A | 11/1987 | Hart, Jr. | |
| 4,808,302 A * | 2/1989 | Beall, Jr. | 210/117 |
| 4,830,744 A * | 5/1989 | Burrows | 210/110 |
| 4,853,117 A | 8/1989 | Burrows | |
| 5,132,017 A | 7/1992 | Birdsong et al. | |
| 5,991,884 A * | 11/1999 | Lin et al. | 713/300 |
| 6,110,360 A | 8/2000 | Hart, Jr. | |
| 6,764,595 B1 | 7/2004 | Halemba et al. | |
| 7,285,210 B2 * | 10/2007 | Schmitt | 210/195.2 |
| 7,353,838 B2 * | 4/2008 | Schmitt et al. | 137/315.12 |

* cited by examiner

*Primary Examiner*—Ana M Fortuna
(74) *Attorney, Agent, or Firm*—Edwards Angell Palmer & Dodge LLP; George N. Chaclas

(57) ABSTRACT

A reverse osmosis liquid filtering assembly includes a reverse osmosis membrane for receiving intake liquid and creating permeate and concentrate liquid and a tank having a first chamber for storing the permeate and a second chamber for receiving the concentrate liquid, the first and second chambers being operatively connected so that the concentrate liquid in the second chamber pressurizes the permeate in the first chamber. The embodiment may further include means for directing the concentrate liquid into the second chamber, wherein the means selectively directs the concentrate liquid into the second chamber only when the faucet is open. To relieve backpressure, a connection between the second chamber and drain may be provided.

17 Claims, 2 Drawing Sheets

REVERSE OSMOSIS WATER FILTERING SYSTEM

CROSS-REFERENCE TO RELATED APPLICATIONS

This application claims priority to U.S. Provisional Patent Application No. 60/746,242, filed May 2, 2006, which is incorporated herein by reference.

TECHNICAL FIELD OF THE DISCLOSURE

The present disclosure relates to new and improved reverse osmosis water filtering systems.

BACKGROUND OF THE DISCLOSURE

As is known, a reverse osmosis (RO) water filtering process uses a semi-permeable membrane that has the ability to remove and reject a wide spectrum of impurities and contaminants from water using only water pressure. These contaminants are automatically rinsed down the drain. The purified water is then stored in a tank for dispensing through an auxiliary faucet.

A typical residential RO water filtering system is installed under a kitchen sink and includes a filter assembly, a reverse osmosis membrane, a storage tank, and an auxiliary faucet attached to the sink. The filter assembly includes a sediment filter and a carbon filter. Intake water enters the system from a cold-water source and is routed through the filter system. The sediment filter removes sediment such as sand and dirt and the like from the intake water, while the carbon filter removes chlorine and other contaminants that cause bad color, odor and taste. The filtered water is then routed to the RO membrane.

The RO membrane includes three ports: an intake port, a permeate outlet port, and a concentrate outlet port. The intake port receives filtered intake water from the filter assembly, and permeate passes through the membrane to the permeate outlet port, while the concentrate water does not pass through the membrane but is directed to the concentrate outlet port. Concentrate water is routed from the concentrate outlet port through a flow restrictor for disposal down a drain of the sink.

Most plumbing codes specify that an anti-siphon or air gap must be located between the concentrate outlet port and the drain. This prevents development of a vacuum in the system that could cause drain or wastewater to be siphoned back into the RO system and contaminate the water supply connected to the RO system. The auxiliary faucet, normally also includes an air gap connecting the concentrate outlet port and the drain.

The permeate is routed from the permeate outlet port to the tank to be stored under pressure. An automatic shut-off valve stops the flow of water to the membrane and to the tank when the tank is full. When the auxiliary faucet is opened by a user, permeate is forced from the tank, through a carbon filter, and out the faucet.

In a typical RO system, especially in the type of RO system used in homes, the rate at which treated water or "permeate" is produced by the system can be very low. As a result, the storage tank is used to store permeate, so that relatively large quantities can be made available when the consumer opens the tap or faucet. In the past, "pre-charged" storage tanks were used. In this type of storage tank, a bladder is used to define a pressurized chamber, usually filled with a compressible gas, such as nitrogen. The bladder isolates the gas from the permeate received by the tank. As the permeate is received by the tank, the permeate gradually compresses the gas in the pressurized chamber. As a result, the permeate is stored under pressure, such that when the tank is opened, the pressure in the storage tank exerted by the compressed gas, forces permeate out of the tank to the faucet.

Although these storage tanks are widely used and provide a suitable means for storing permeate, the storage tanks do have a significant drawback. As more and more permeate is received by the tank, the pressure needed to effect flow of permeate into the tank increases because as the gas chamber is compressed, forces on the bladder increase and the backpressure in the system increases. Accordingly, in order to completely fill the storage tank, a significant pressure must be applied to the permeate as the capacity of the tank is reached. This pressure increase reduces the efficiency of the RO membrane.

This resistance to flow exerted by the storage tank decreases the production rate of the RO system, since the RO system relies on differential pressures between the source and the output to effect flow across the membrane. In addition, as permeate is discharged by the storage tank, the permeate delivery pressure is gradually reduced as the pressurized gas chamber expands. This reduced delivery pressure is observable at the auxiliary faucet. Further examples of prior art systems are shown in U.S. Pat. Nos. 6,764,595; 6,110,360; 5,132,017; 4,853,117; and 4,705,625, each of which is incorporated herein by reference in its entirety.

What is still desired is a new and improved RO water filtering system. Preferably, the RO water filtering system will include an improved permeate storage arrangement that reduces backpressure within the system and/or provides a steadier pressure at the faucet.

SUMMARY OF THE DISCLOSURE

The present disclosure provides a new and improved RO water filtering system. Among other aspects and advantages, the RO water filtering system of the present disclosure includes an improved permeate storage arrangement that reduces backpressure within the system. The storage arrangement is adapted to pressurize permeate in a storage tank using concentrate water. In one embodiment, the permeate is pushed out of the storage tank only when the permeate or auxiliary faucet assembly is open.

The present disclosure also provides an auxiliary faucet assembly for use as part of the RO water filtering system. The auxiliary faucet assembly is adapted so that the flow of concentrate water into the storage tank is synchronized with the flow of permeate out of the storage tank. Preferably, the RO water filtering system utilizes off the shelf components whenever possible to allow for easy, cost-effective manufacture and assembly.

One embodiment of the subject technology is directed to a reverse osmosis liquid filtering assembly including a reverse osmosis membrane for receiving intake liquid and creating permeate and concentrate liquid and a tank having a first chamber for storing the permeate and a second chamber for receiving the concentrate liquid, the first and second chambers being operatively connected so that the concentrate liquid in the second chamber pressurizes the permeate in the first chamber. The embodiment may further include means for directing the concentrate liquid into the second chamber, wherein the means selectively directs the concentrate liquid into the second chamber only when the faucet is open. To relieve backpressure, a connection between the second chamber and drain may be provided.

Another embodiment is directed to a method of filtering a liquid comprising the steps of using reverse osmosis on the liquid to create a permeate flow and a concentrate flow, storing the permeate flow in a chamber formed in a tank, selectively dispensing the permeate flow from the tank and when the permeate flow is dispensed, directing the concentrate flow into a portion of the tank to facilitate dispensing the permeate flow. The permeate can be dispensed from a mechanism such as a faucet assembly, an ice-maker assembly and a combination thereof. Backpressure in the tank may be reduced by connecting the portion to drain.

In still another embodiment, the subject technology is a liquid filtering assembly including a reverse osmosis membrane for receiving intake liquid and creating permeate and concentrate liquid and a tank. The tank has a chamber for storing the permeate for selective dispensing and a portion for receiving the concentrate liquid, the portion being operatively connected so that the concentrate liquid passes to drain to relieve a backpressure on the reverse osmosis filter when the permeate is not being dispensed. The concentrate liquid in the portion may pressurize the permeate in the first chamber when the permeate is being dispensed.

A further embodiment is a liquid filtering assembly including a cleaning assembly for receiving intake liquid and creating a clean flow and a reject flow and a tank having a chamber for storing the clean flow and a portion for receiving a secondary flow, the chamber and portion being operatively connected so that the secondary flow in the portion pressurizes the clean flow in the chamber, wherein the secondary flow is selected from the group consisting of the intake liquid, reject flow and combinations thereof.

Additional aspects and advantages of the present disclosure will become readily apparent to those skilled in this art from the following detailed description, wherein exemplary embodiments of the present disclosure are shown and described, simply by way of illustration of the best modes contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figure 1:
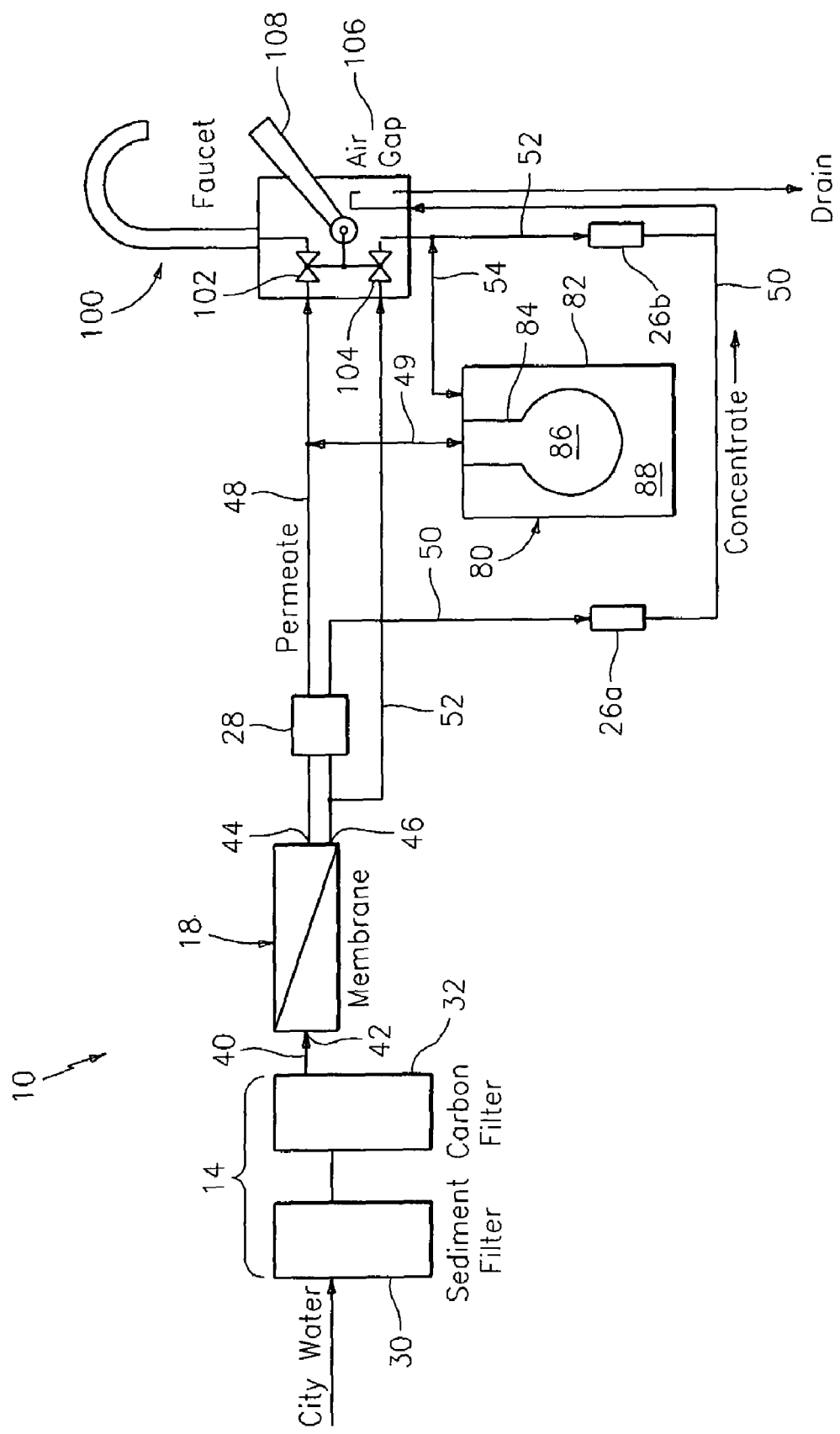
FIG. 1 is a schematic drawing that shows an exemplary embodiment of a new and improved RO water filtering system constructed in accordance with the present disclosure.

The present invention overcomes many of the prior art problems associated with reverse osmosis (RO) filtering systems. The advantages, and other features of the RO filtering systems disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Additionally, the illustrated and described embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed systems or methods. Further, the shapes and sizes of components are also somewhat schematic for exemplary purposes and can be altered without materially affecting or limiting the disclosed technology. For clarity, common items such as conduits, tubing interconnections and interconnections have not been specifically included or represented schematically in the Figures as would be appreciated by those of ordinary skill in the pertinent art.

FIG. 1 shows an exemplary embodiment of a new and improved RO water filtering system 10 constructed in accordance with the present disclosure. Intake water enters the filtering system 10 from a water source, such as city water, and is routed therethrough. The RO water filtering system 10 generates purified water or permeate for dispensing from a faucet assembly 100 and waste or concentrate water that is ultimately rejected to drain.

In brief overview, the system 10 includes a filter assembly 14 for initially removing sediment and contaminants. The filter assembly 14 can include a sediment filter 30 and a carbon filter 32. After passing through the filter assembly 14, the filtered water passes a RO membrane 18 that creates permeate and concentrate water. A storage tank 80 accumulates the permeate while using the concentrate water to selectively create pressure upon the stored permeate. The RO water filtering system 10 also includes an auxiliary faucet assembly 100 that works with flow restrictors 26a and 26b and a shut-off valve 28 to control the output of the RO water filtering system 10.

The storage tank 80 includes an outer container 82 housing an expandable resilient bladder 84. The expandable bladder 84 forms a permeate storage chamber 86, while a concentrate water chamber 88 is formed between the bladder 84 and the outer container 82. Because the bladder 84 is flexible and expands, pressure equalizes within the tank 80 generally. Thus, higher pressure in the concentrate chamber 88 will urge permeate from the storage chamber 86 and lower pressure in the concentrate chamber 88 reduces and/or removes resistance on permeate into the permeate storage chamber 86. In one embodiment, the bladder 84 is fabricated from an elastomeric material.

The RO membrane 18 includes three ports: an intake port 42, a permeate outlet port 44, and a concentrate outlet port 46. The intake port 42 receives filtered intake water from the filter assembly 14 through a water tube 40. The permeate is routed from the outlet port 44 through the shut-off valve 28 and permeate tube 48 and to a first valve 102 of the faucet assembly 100. The permeate is also diverted through a permeate diverter tube 49 to the permeate storage chamber 86 of the storage tank 80 to be stored under pressure until the valve 102 of the faucet assembly 100 is opened. When the valve 102 is opened by a user, permeate is forced from the tank 80 and out the faucet assembly 100. The combination of intake pressure differential and pressure from the concentrate water contained in the concentrate water chamber 88 provides excellent outflow of permeate.

Concentrate water is routed from the outlet port 46 through the shut-off valve 28 and a primary concentrate tube 50, and then through an air gap 106 of the faucet for subsequent disposal down drain 110. One of the flow restrictors 26a is provided in the primary concentrate tube 50.

The shut-off valve 28 is automatic and is adapted to stop the flow of concentrate water through to the primary concentrate tube 50 when the permeate storage chamber 86 of the tank 80 becomes full of permeate and pressure within the permeate tube 48 rises past a predetermined level indicating that the permeate storage chamber 86 is full. The blocked primary concentrate tube 50 prevents additional filtered water from entering the intake port 42 of the RO membrane and prevents the production of additional permeate.

A secondary concentrate tube 52 branches off from the primary concentrate tube 50 between the RO membrane 18 and the shut-off switch 28. The secondary concentrate tube 52 is routed through a second valve 104 of the faucet assembly 100 and connects back to the primary concentrate tube 50 between the first flow restrictor 26a and the air gap 106 of the faucet assembly 100. The other of the flow restrictors 26a is provided in the secondary concentrate tube 52. A concentrate diverter tube 54 connects the concentrate water chamber 88 of the tank 80 to the secondary concentrate tube 52 between the second valve 104 and the second flow restrictor 26b. The valves 28, 102, 104 may be any kind of valve now known and later developed such as a pin valve, a ball valve, a gate valve, a globe valve, or a butterfly valve. Although not shown explicitly, the branching of the various tubes could be by several means such as diverters or T-shaped fittings.

The faucet assembly 100 includes a lever 108 that controls both of the first and second valves 102, 104 of the faucet assembly 100, such that the valves 102, 104 are substantially simultaneously opened and closed. During operation with the valves 102, 104 closed, the RO water filtering system 10 operates until the permeate storage chamber 86 is full and the shut-off switch 28 closes the primary concentrate tube 50. At this point, the permeate storage chamber 86 is at its largest volume while the concentrate chamber 88 of the tank 80 is at its smallest volume, with excess concentrate water being expelled from the concentrate chamber 88, through the second flow restrictor 26b and the air gap 106, and down the drain. Throughout the expansion of the permeate storage chamber 86, backpressure advantageously remains low while the efficiency of the RO membrane remains high because of the expulsion of the concentrate water from the concentrate chamber 88.

When the lever 108 of the faucet assembly 100 is opened, both valves 102, 104 are opened. Permeate is directed from the permeate storage chamber 86 to the faucet assembly 100 by the open first valve 102, while concentrate water is directed through tubes 52, 54 to the concentrate chamber 88 by the open second valve 104. The concentrate water flowing into the concentrate chamber 88 provides additional pressure for expelling the permeate from the permeate storage chamber 86. As a result, the exit flow from the faucet assembly 100 is adequately maintained as the permeate storage chamber 86 empties.

Figure 2:
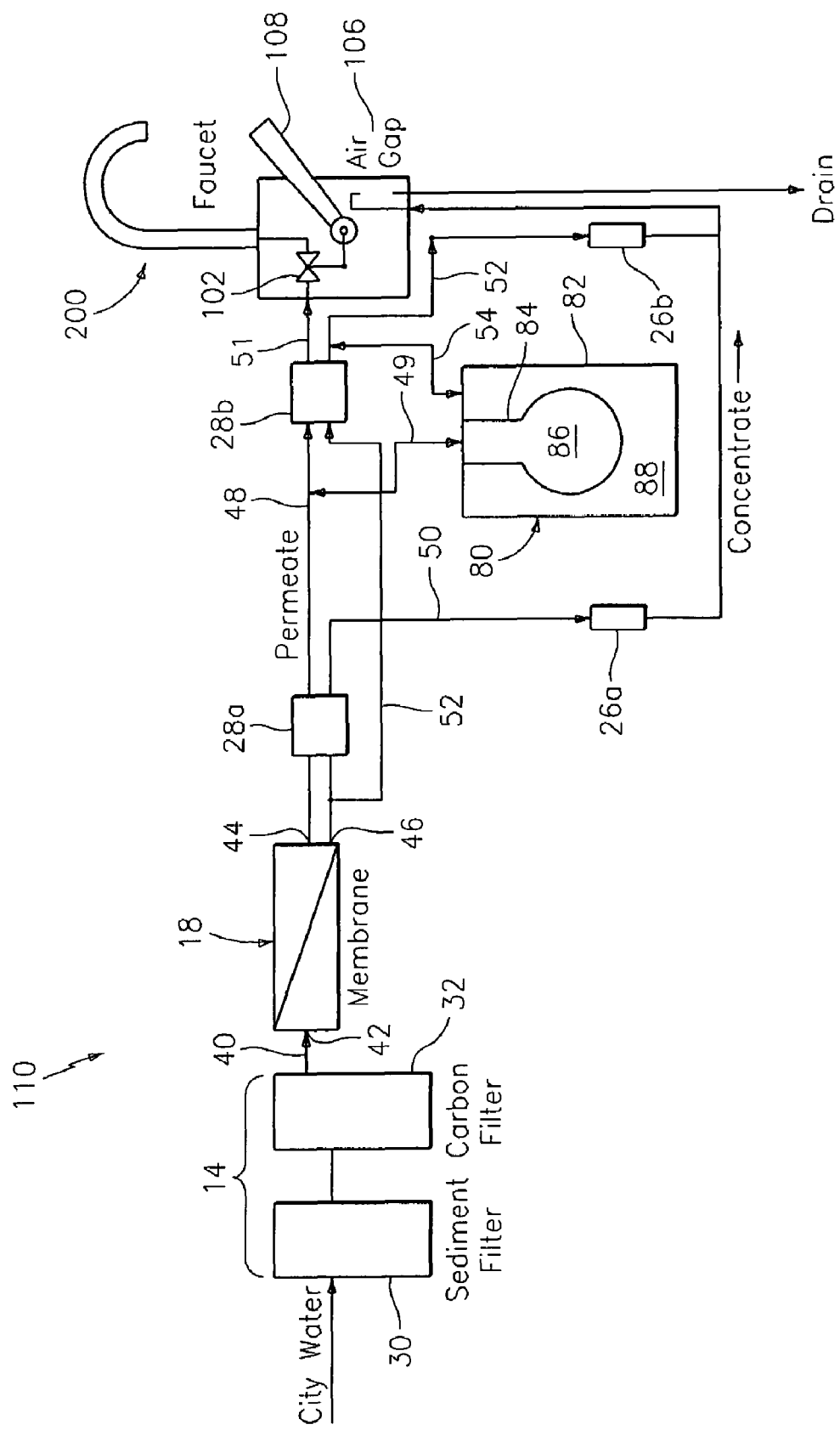
FIG. 2 is a schematic drawing that shows another exemplary embodiment of a new and improved RO water filtering system constructed in accordance with the present disclosure.

FIG. 2 shows another exemplary embodiment of a new and improved RO water filtering system 110 constructed in accordance with the present disclosure. The embodiment 110 of FIG. 2 is similar to the embodiment 10 of FIG. 1 such that similar elements have the same reference number. The filtering system 110 uses concentrate to to provide pressure, thus similar to above, water is not wasted as compared to systems that use intake water to pressurize. Further, the filtering system 110 desirably uses standard components like diaphragm valves and flow restrictors to accomplish the objectives.

A primary difference of the water filtering system 110 is the use of two shut-off valves 28a and 28b with a modified auxiliary faucet assembly 200. The faucet assembly 200 includes only one valve 102 for controlling flow of the permeate. Accordingly, when the lever 108 is actuated to dispense permeate, the permeate in the tank 80 is urged out of the faucet assembly 200. It is envisioned that the faucet assembly 200 could be any device for using or dispensing purified water such as an ice-maker or other application. Commonly, the faucet assembly 200 and ice-maker would both receive permeate from the system 110.

As shown, the second shut-off valve 28b is connected in the permeate path between the RO membrane 18 and faucet assembly 200. Tubing 51 connects the permeate output of the shut-off valve 28b to the faucet valve 102. In the concentrate path, the second shut-off valve 28b is connected between the RO membrane 18 and the concentrate chamber 88 with the secondary concentrate tube 52 passing to drain and having a concentrate diverter tube 54 branch to bring the concentrate to the concentrate chamber 88 of the tank 80. Shut-off valves 28a, 28b may be the exact same part. In a preferred embodiment, the shut-off valves 28a, 28b close upon the exit pressure being two thirds of the inlet pressure.

In operation, the shut-off valve 28b responds to pressure changes. When the lever 108 opens, the pressure drops in tubing 51 to open the shut-off valve 28b to allow permeate and concentrate water to flow there through. As a result, concentrate water flows into the concentrate chamber 88 via the diverter tube 54 to urge the permeate water in the permeate storage chamber 86 into diverter tube 49 and ultimately out the faucet 200. For the time that the faucet is open, the flow restrictor 26b also creates some bleeding to drain, but the flow restrictor 26b is sized so that the bleed level is acceptable.

Upon closing the lever 108, the pressure builds in tubing 51 so that the shut-off valve 28b closes. With the shut-off valve 28b closed, the permeate passes into the permeate storage chamber 86. The concentrate chamber 88 is still open to drain via tubing 52, 54. The flow restrictor 26b drains more quickly than the RO membrane 18 makes permeate so that the system back pressure is minimal, if any, and the efficiency of the RO membrane 18 is improved. As a result of the minimal back pressure, the permeate not only replenishes quickly without resistance, a fast wash effect occurs at the RO membrane 18. In other words, the increased flow across the RO membrane has a cleaning effect.

It is noted that the subject technology would be useful in many applications. For example, the permeate could be used to supply an ice-maker or any other similar device that uses purified water. Any liquid can be effectively purified and stored for dispensing. Further, any type filter(s) may be used instead of or in addition to the combination of sediment, carbon and reverse osmosis shown, whether the filters are now known or later developed. Preferably, the filtering generates a clean flow for storage and subsequent use as well as a reject flow. Alternatively, the intake, well or municipal water could be routed to the chamber 88 via the shut-off valve 28b or directly to provide the pressurizing of the permeate storage chamber 86. This mode could even be used with the concentrate water simply routed to drain.

In view of the above, the present disclosure provides new and improved RO filtering systems. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects.

What is claimed is:

1. A reverse osmosis liquid filtering assembly comprising:
a faucet
a reverse osmosis membrane including an inlet for receiving intake liquid, a permeate outlet port for dispensing permeate liquid, and a concentrate outlet port for dispensing concentrate liquid;
a permeate tube connecting the permeate outlet port to the faucet;
a first valve controlling flow through the permeate tube;
a concentrate tube having a first end connected to the concentrate outlet port and a second end for connection to a drain;
a second valve controlling flow through the concentrate tube;
a tank having a first chamber for storing the permeate liquid and a second chamber for receiving the concentrate liquid, the first and second chambers being operatively connected so that the concentrate liquid in the second chamber pressurizes the permeate liquid in the first chamber;
a permeate diverter tube connecting the first chamber of the tank to the permeate tube between the permeate outlet port and the first valve;
a concentrate diverter tube connecting the second chamber of the tank to the concentrate tube between the second valve and the second end of the concentrate tube; wherein the
second valve opens and directs the concentrate liquid into the second chamber only when the first valve is opened to dispense permeate liquid from the faucet; and
a flow restrictor located in the concentrate tube between the concentrate diverter tube and the second end of the concentrate tube such that flow resistance to the second chamber is less than flow resistance to the drain, so that concentrate liquid is first diverted to the first chamber, and flow resistance to the drain is less than flow resistance into the first chamber of the tank so that the flow of the permeate liquid into the first chamber can force the concentrate liquid out of the second chamber to the drain.

2. A reverse osmosis liquid filtering assembly as recited in claim 1, further comprising a lever connected to the first and the second valves such that movement of the lever in a first direction cause the first valve to open and the second valve to close while movement of the lever in a second direction cause the first valve to open and the second valve to close.

3. A reverse osmosis liquid filtering assembly as recited in claim 1, wherein the second valve is operatively connected to the permeate tube such that the second valve opens when the first valve is opened and pressure drops in the permeate tube.

4. A filtering assembly as recited in claim 1, wherein an expandably resilient bladder separates the first chamber from the second chamber.

5. A filtering assembly as recited in claim 1, wherein the concentrate tube comprises a secondary concentrate tube and the assembly further comprises:
a primary concentrate tube having a first end connected to the concentrate outlet port of the reverse osmosis membrane and a second end for connection to the drain; and
a shut-off valve for preventing flow through the primary concentrate tube when the first chamber is full.

6. A filtering assembly as recited in claim 5, further comprising a flow restrictor in the primary concentrate tube.

7. A liquid filtering assembly comprising:
(a) a reverse osmosis membrane for receiving intake liquid and creating permeate and concentrate;
(b) a tank having:
 i) a first chamber for storing the permeate for selective dispensing; and
 ii) a second chamber for receiving the concentrate, wherein expansion of the second chamber causes contraction of the first chamber;
(c) concentrate tubing for connection between the second chamber and a drain so that the concentrate passes to the drain to relieve a backpressure on the reverse osmosis filter when the permeate is not being dispensed;
(d) a shut-off valve connected to the permeate and the concentrate, wherein the shut-off valve switches between an open and closed position upon pressure changes in the permeate, the shut-off valve also being connected to the concentrate such that in the open position, the concentrate flows into the concentrate tubing connected to the second chamber of the tank and the drain and, in the closed position, the concentrate flow to the second chamber and the drain is blocked; and
(e) a faucet connected to the first chamber through permeate tubing for dispensing the permeate through the faucet, wherein the shut-off valve measures permeate pressure in the permeate tube between the first chamber and a valve of the faucet.

8. A liquid filtering assembly as recited in claim 7, wherein the shut-off valve is a diaphragm type shut-off valve.

9. A liquid filtering assembly as recited in claim 7, further comprising a flow restrictor in the concentrate tubing.

10. A filtering assembly as recited in claim 7, wherein an expandably resilient bladder separates the first chamber from the second chamber.

11. A filtering assembly as recited in claim 7, further comprising:
a primary concentrate tube for transporting concentrate directly from the reverse osmosis membrane to the drain; and
a shut-off valve for preventing flow through the primary concentrate tube when the first chamber is full.

12. A filtering assembly as recited in claim 11, further comprising a flow restrictor in the primary concentrate tube.

13. A reverse osmosis liquid filtering assembly comprising:
a reverse osmosis membrane assembly for receiving liquid and creating permeate and concentrate, wherein the reverse osmosis assembly defines an inlet, a permeate outlet port and a concentrate outlet port;
a tank having a first chamber in fluid communication with the permeate outlet port for storing the permeate and a second chamber in fluid communication with the concentrate outlet port for receiving the concentrate, wherein the first and second chambers are operatively connected so that the concentrate in the second chamber pressurizes the permeate in the first chamber;
a faucet assembly including,
 a faucet outlet,
 a first valve connected to the faucet outlet, the permeate outlet port and the first chamber,
 a second valve connected to a drain, the concentrate outlet port and the second chamber, and
 a lever connected to the first and second valves for substantially simultaneously opening and closing the first and second valves; and
wherein when the first and second valves are opened, permeate passes from the first chamber to the faucet outlet and concentrate is directed into the second chamber for providing pressure to expel the stored permeate from the first chamber.

14. A filtering assembly as recited in claim 13, further comprising a tube connected between the second chamber and drain to relieve backpressure in the second chamber of the tank when the first and second valves are closed.

15. A filtering assembly as recited in claim 14, further comprising a flow restricter in the tube.

16. A filtering assembly as recited in claim 13, further comprising:

a primary concentrate tube having a first end connected to the concentrate outlet port of the reverse osmosis membrane and a second end for connection to the drain; and a shut-off valve for preventing flow through the primary concentrate tube when the first chamber is full.

17. A filtering assembly as recited in claim 16, further comprising a flow restrictor in the primary concentrate tube.

* * * * *